(12) United States Patent  (10) Patent No.: US 8,736,086 B2
Yang                      (45) Date of Patent:    *May 27, 2014

(54) RECIPROCAL VIBRATION TYPE POWER GENERATOR EQUIPPED WITH INNER COLUMNAR AND OUTER ANNULAR MAGNETIC MEMBERS, A POWER STORAGE DEVICE, A RECTIFYING CIRCUIT, AND A CHARGING CIRCUIT

(76) Inventor: Tai-Her Yang, Dzan-Hwa (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/071,627

(22) Filed: Mar. 25, 2011

(65) Prior Publication Data

US 2012/0242086 A1    Sep. 27, 2012

(51) Int. Cl.
*F03G 7/08* (2006.01)

(52) U.S. Cl.
USPC ......................................................... 290/1 R

(58) Field of Classification Search
None
See application file for complete search history.

(56) References Cited

U.S. PATENT DOCUMENTS

| | | | |
|---|---|---|---|
| 6,220,719 B1 * | 4/2001 | Vetorino et al. | 362/192 |
| 6,729,744 B2 * | 5/2004 | Mah | 362/192 |
| 6,768,230 B2 * | 7/2004 | Cheung et al. | 310/30 |
| 6,809,427 B2 * | 10/2004 | Cheung et al. | 290/1 R |
| 7,148,583 B1 * | 12/2006 | Shau et al. | 290/1 R |
| 7,332,826 B2 * | 2/2008 | Terzian et al. | 290/1 R |
| 7,688,036 B2 * | 3/2010 | Yarger et al. | 320/137 |
| 8,519,573 B2 * | 8/2013 | Keisuke et al. | 310/15 |
| 2004/0004405 A1 * | 1/2004 | Ausderau | 310/12 |
| 2005/0225181 A1 * | 10/2005 | Tu et al. | 310/12 |
| 2008/0001484 A1 * | 1/2008 | Fuller et al. | 310/15 |
| 2008/0054731 A1 * | 3/2008 | Tu et al. | 310/12 |
| 2008/0296984 A1 * | 12/2008 | Honma et al. | 310/17 |
| 2009/0108590 A1 * | 4/2009 | Mabuchi et al. | 290/1 R |
| 2013/0193693 A1 * | 8/2013 | Marin et al. | 290/1 R |
| 2013/0313838 A1 * | 11/2013 | Sakamoto et al. | 290/1 R |

* cited by examiner

*Primary Examiner* — Tulsidas C Patel
*Assistant Examiner* — S. Mikailoff
(74) *Attorney, Agent, or Firm* — Bacon & Thomas, PLLC

(57) ABSTRACT

A reciprocal vibration type power generator includes a housing, a coil set seat, a power generation coil set surrounding the coil set seat, and a motion block including an outer magnetic member and a columnar magnet. An inner space is formed between the outer magnetic member and a periphery of the columnar magnet to enable reciprocal relative axial movement between the motion block and the coil set seat when the generator is vibrated. A rectifying and charging circuit is connected to the power generation coil set to rectify power induced in the power generation coil set upon movement of the motion block, and to supply the rectified power to a power storage device. The rectifying and charging circuit is also connected to input/output terminals on the generator housing for outputting power to an external device, and for inputting external charging power to the power storage device.

19 Claims, 3 Drawing Sheets

(1)

RECIPROCAL VIBRATION TYPE POWER GENERATOR EQUIPPED WITH INNER COLUMNAR AND OUTER ANNULAR MAGNETIC MEMBERS, A POWER STORAGE DEVICE, A RECTIFYING CIRCUIT, AND A CHARGING CIRCUIT

BACKGROUND OF THE INVENTION (a) Field of the Invention

The present invention is a novel design for a reciprocal vibration type power generator that includes a housing, a coil set seat, a power generation coil set surrounding the coil set seat, and a motion block including an outer magnetic member and a columnar magnet. An inner space is formed between the outer magnetic member and a periphery of the columnar magnet to enable reciprocal relative axial movement between the motion block and the coil set seat when the generator is vibrated. A rectifying and charging circuit is connected to the power generation coil set to rectify power induced in the power generation coil set upon movement of the motion block, and to supply the rectified power to a power storage device. The rectifying and charging circuit is also connected to input/output terminals on the generator housing for outputting power to an external device, and for inputting external charging power to the power storage device.

(b) Description of the Prior Art

The conventional axial vibration type power generator utilizes a round columnar magnet axially coupled with an annular power generation coil set for performing axial vibrating displacement, so that the power generation coil set is enabled to generate electric power based on Lenz's Law. However, the coupling magnetic lines of the columnar magnet and the annular power generation coil set are transmitted through air, increasing the magnetic resistance and lowering the voltage of the generated electric power, and power storage is not sufficient.

SUMMARY OF THE INVENTION

The present invention includes a columnar magnet in a round columnar shape and having different magnetic poles in the axial direction, and an outer magnetic conductive member enclosing the exterior of the columnar magnet. The columnar magnet and outer magnetic conductive member are combined to form a motion block assembly (106) and are coaxially and adjacently disposed to provide a magnetic path for performing synchronous axial displacement. The outer diameter of the columnar magnet is smaller than the inner diameter of the outer magnetic conductive member and formed with an annular gap, allowing an annular power generation coil set to pass therebetween Consequently, when the columnar magnet and the outer magnetic conductive member are subjected to relative reciprocal axial vibrations, the annular power generation coil set is enabled to generate electric power based on Lenz's Law, and the generated electric energy is stored in a power storage device through a rectifying and charging circuit. The generator further includes an anode output/input terminal and a cathode output/input terminal connected to the power storage device for serving as electric energy output/input interfaces.

Figure 1:
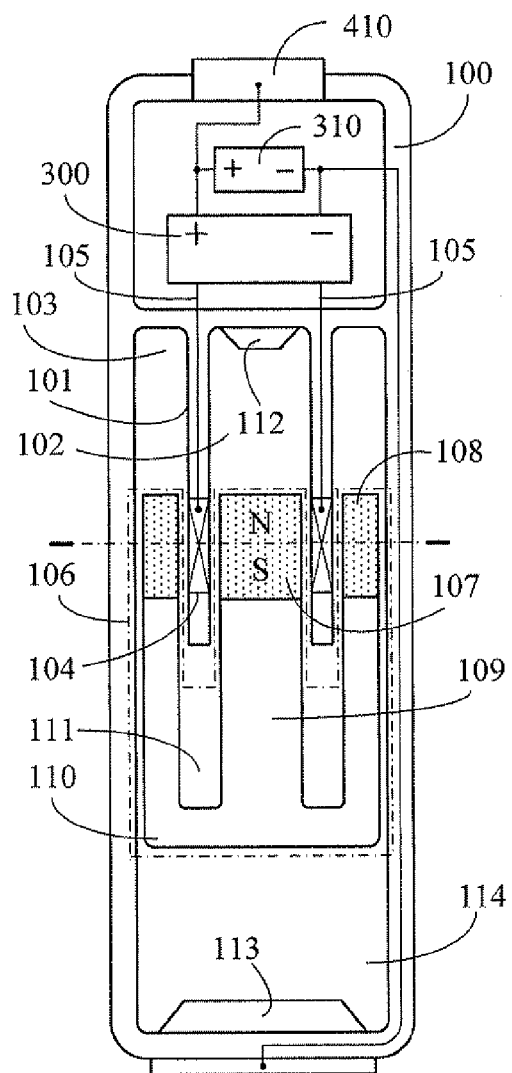
FIG. 1 is a schematic structural view showing an annular power generation coil set having an interior adjacent to and magnetically coupling with a columnar magnet, and an exterior adjacent to and magnetically coupling with an outer magnetic conductive member, according to one embodiment of the present invention.

DESCRIPTION OF MAIN COMPONENT SYMBOLS (100): Housing
(101): Tubular annular coil set seat
(102): Cylindrical Space
(103): Annular space
(104) (204): Annular power generation coil set
(105): Output wires
(106) (206): Motion block assembly
(107) (207): Columnar magnet
(108) (208): Annular outer magnetically conductive member
(109) (209): Center column of motion block
(110): Cup-shaped structure of motion block
(111): Inner annular space of motion block
(112): First buffer member
(113): Second buffer member
(114): Cylindrical space inside the housing
(117) (217): Outer magnet
(201): Tubular annular coil set partition seat
(210): Annular partition ring
(300): Rectifying and charging circuit
(310): Power storage device
(410): Anode output/input terminal
(420): Cathode output/input terminal

DETAILED DESCRIPTION OF THE PREFERRED EMBODIMENTS

The conventional axial vibration type power generator utilizes a round columnar magnet axially coupled with an annular power generation coil set for performing axial vibrating displacement, so that the power generation coil set is enabled to generate electric power based on Lenz's Law. However, the coupling magnetic lines of the columnar magnet and the annular power generation coil set are transmitted through air, and thereby the magnetic resistance is relatively large and the voltage of the generated electric power is therefore lowered, and power storage is not sufficient.

The present invention comprises a columnar magnet having a round columnar shape and different magnetic poles in an axial direction, and an outer magnetically conductive member enclosing the exterior of the columnar magnet, the columnar magnet and outer magnetic conductive member being combined to form a motion block assembly (106). The columnar magnet and outer magnetically conductive member are coaxial and disposed adjacent to each other to provide a magnetic path for enabling synchronous axial displacement. The outer diameter of the columnar magnet is smaller than the inner diameter of the outer magnetically conductive member and formed with an annular gap to allow an annular power generation coil set to pass therebetween, so that when the columnar magnet and the outer magnetically conductive member undergo relative reciprocal axial displacement as a result of vibrations, the annular power generation coil set is enabled to generate electric power based on Lenz's Law, and the electric energy is stored in a power storage device through a rectifying and charging circuit, and installed with an anode output/input terminal and a cathode output/input terminal of power storage device for serving as electric energy output/input interfaces.

The present invention is a novel design for an axial vibration type power generator, wherein the outer end of the location where the columnar magnet passes the annular power generation coil set is installed with an outer magnetic conductive member for reducing the magnetic resistance generated while the magnetic poles at two ends of the columnar magnet pass the annular power generation coil set, the columnar magnet and the outer magnetic conductive member being jointly combined to form a motion block assembly (106) capable of synchronous axial displacement so as to pass the annular power generation coil set, and enable the annular power generation coil set to generate electric power based on Lenz's Law. The electric energy is stored in a power storage device through a rectifying and charging circuit, and the generator is further installed with an anode output/input terminal and a cathode output/input terminal connected to the power storage device for serving as electric energy output/input interfaces.

Figure 2:
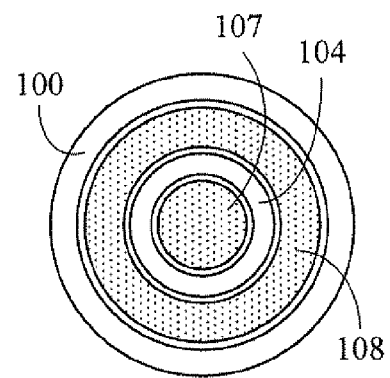
FIG. 2 is a cross-sectional view of the embodiment of FIG. 1.

FIG. 1 is a schematic structural view showing an annular power generation coil set (104) having an interior coupled with a columnar magnet (107), and an exterior coupled with an outer magnetic conductive member (108), according to a first embodiment of the present invention and FIG. 2 is a cross-sectional view of the annular power generation coil set of FIG. 1.

As shown in FIG. 1 and FIG. 2, this embodiment includes the following features:

A housing (100) is constituted by a material having poor magnetic conduction and poor electrical conduction, formed in a hollow cylindrical shape and having an inner end from which inwardly extends a tubular annular coil set seat (101) with a distal end connecting to the annular power generation coil set (104). An annular space (103) is formed between the tubular annular coil set seat (101) and the inner space of the housing (100), the center of the tubular annular coil set seat (101) is formed with a round space (102), and the annular power generation coil set (104) is connected to input and output wires (105) for outputting the electric power generated by the annular power generation coil set (104) to a rectifying and charging circuit (300), then output to the anode terminal of a power storage device (310) from the output end of the rectifying and charging circuit (300), and then output to an anode output/input terminal (410) and a cathode output/input terminal (420) installed in the housing (100) from the anode terminal of the power storage device (310).

A motion block assembly (106) is constituted by a material having poor magnetic conduction and poor electric conduction, and is provided with a cup-shaped structure that forms a motion block (110) for combining with the outer magnetic conductive member (108). The center of the cup-shaped structure of motion block (110) is provided with a center column (109) for combining with the columnar magnet (107), and the periphery of the central column of motion block (109) and the cup-shaped structure of motion block (110) form an inner annular space (111) for receiving the annular power generation coil set (104) and the tubular annular coil set seat (101), and for allowing the coil set (104) and the coil set seat (101) to perform relative axial displacement. round space (102) of the tubular annular coil set seat (101) is provided for receiving the columnar magnet (107) and the center column of motion block (109) and allowing the columnar magnet (107) and center column of motion block (109) to perform relative axial displacement.

A first buffer member (112) is installed between the round space (102) of the tubular annular coil set seat (101) and the inner wall of the housing (100) for serving as a buffer while the center column (109) and the columnar magnet (107) of the motion block assembly (106) and the outer magnetic conductive member (108) perform axial displacement.

The above-mentioned columnar magnet (107) for performing axial reciprocal movement relative to the outer magnetic conductive member (108) in response to vibrations to pass through the annular power generation coil set (104), enabling the annular power generation coil set (104) to generate power.

A rectifying and charging circuit (300) is constituted by electromechanical and solid electronic components and rectifying devices, and provided for rectifying the electric power generated by the annular power generation coil set (104) and then inputting the electric power to the power storage device (310).

Power storage device (310) is constituted by a rechargeable secondary battery, ultra capacitor, or capacitor, and provided for storing the electric power from the rectifying and charging circuit (300) or electric power input from the anode output/input terminal (410) and the cathode output/input terminal (420).

Anode output/input terminal (410) is constituted by an electrically conductive terminal head, terminal, plug, or socket structure, and installed in the housing (100) and connected to the anode terminal of the rectifying and charging circuit (300) for outputting or inputting electric energy to the exterior.

Cathode output/input terminal (420) is constituted by an electrically conductive terminal head, terminal, plug, or socket structure, and installed in the housing (100) and connected to the cathode terminal of the rectifying and charging circuit (300) for outputting or inputting electric energy to the exterior.

The cylindrical space (114) inside the housing (100) is provided for being receiving the outer periphery of the motion block assembly (106) and allowing the relative axial displacement, and a second buffer member (113) is installed between the motion block assembly (106) and the cylindrical space (114) inside the housing (100) for serving as a buffer when the motion block assembly (106) performs the axial displacement.

Figure 3:
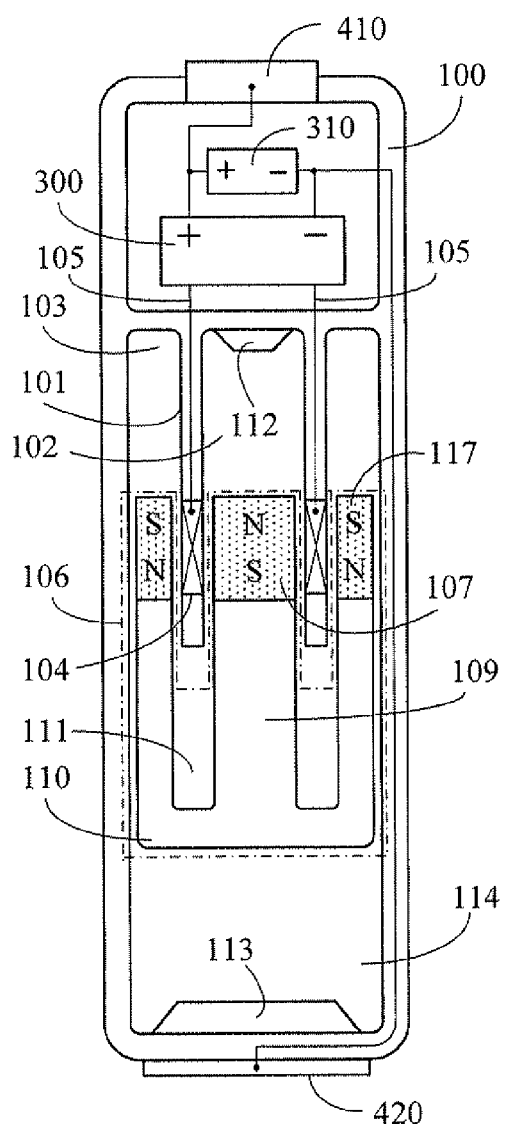
FIG. 3 is a schematic structural view showing an annular power generation coil set having an interior adjacent to and magnetically coupling with a columnar magnet, and an exterior adjacent to and magnetically coupling with an outer magnet having a polarity that is opposite to that of the columnar magnet, according to a second embodiment of the present invention.

FIG. 3 is a schematic structural view showing an annular power generation coil set (104) having an interior coupled with the columnar magnet (107), and an exterior coupled with the outer magnet (117) and relatively installed with the same polarity as the columnar magnet (107), according to a second embodiment of the present invention.

The cross-sectional view of FIG. 3 is the same as that shown in FIG. 2.

As shown in FIG. 3, this embodiment includes the following features:

A housing (100) is constituted by a material having poor magnetic conduction and poor electric conduction, and formed in a hollow cylindrical shape having an inner end from which a tubular annular coil set seat (101) extends inwardly. A distal end of the tubular annular coil set seat (101) connects to an annular power generation coil set (104), and an annular space (103) is formed between the tubular annular coil set seat (101) and an inner hole of the housing (100). The center of the tubular annular coil set seat (101) is formed with a round space (102), and the annular power generation coil set (104) is installed with an output wire (105) for outputting the electric power generated by the annular power generation coil set (104) to a rectifying and charging circuit (300), and then outputting the rectified power to the anode terminal of a power storage device (310) from the output end of the rectifying and charging circuit (300), and to an anode output/input terminal (410) and a cathode output/input terminal (420) installed in the housing (100) from the anode terminal of the power storage device (310).

A motion block assembly (106) is constituted by a material having poor magnetic conduction and poor electric conduction, and is provided with a cup-shaped structure that forms a motion block (110) for combining with an outer magnet (117). The center of the cup-shaped structure of motion block (110) is provided with a center column (109) for combining with a columnar magnet (107), and the periphery of the central column (109) and the cup-shaped structure of the motion block (110) form an inner annular space (111) for accommodating the annular power generation coil set (104) and the tubular annular coil set seat (101) and allowing the coil set (104) and the coil set seat (101) to perform relative axial displacement. The round space (102) of the tubular annular coil set seat (101) accommodates the columnar magnet (107) and the center column (109) and allows the columnar magnet (107) and the center column (109) to perform relative axial displacement.

A first buffer member (112) is installed between the round space (102) of the tubular annular coil set seat (101) and the inner wall of the housing (100) for serving as a buffer while the center column (109) and the columnar magnet (107) of the motion block (110) and the outer magnetic conductive member (108) perform axial displacement.

The columnar magnet (107) performs axial reciprocal motion in response to vibration to cause the outer magnet (117) to pass through the annular power generation coil set (104), enabling the annular power generation coil set (104) to generate power.

Rectifying and charging circuit (300) is constituted by electromechanical and solid electronic components and rectifying devices, and provided for rectifying the electric power generated by the annular power generation coil set (104) and inputting the electric power to the power storage device (310).

Power storage device (310) is constituted by a rechargeable secondary battery, ultra capacitor, or capacitor, and provided for storing the electric power from the rectifying and charging circuit (300) or electric power input from the anode output/input terminal (410) and the cathode output/input terminal (420).

Anode output/input terminal (410) is constituted by an electrically conductive terminal head, terminal, plug, socket structure, and installed in the housing (100) and connected to the anode terminal of the rectifying and charging circuit (300) for outputting or inputting electric energy to the exterior.

Cathode output/input terminal (420) is constituted by electrically conductive terminal head, terminal, plug, or socket structure, and installed in the housing (100) and connected to the cathode terminal of the rectifying and charging circuit (300) for outputting or inputting electric energy to the exterior.

The cylindrical space (114) inside the housing (100) receives the outer periphery of the motion block assembly (106) to enable the motion block assembly (106) to perform the above-described relative axial displacement, and a second buffer member (113) is installed between the motion block assembly (106) and the cylindrical space (114) inside the housing (100) to serve as a buffer when the motion block assembly (106) performs the axial displacement.

Figure 4:
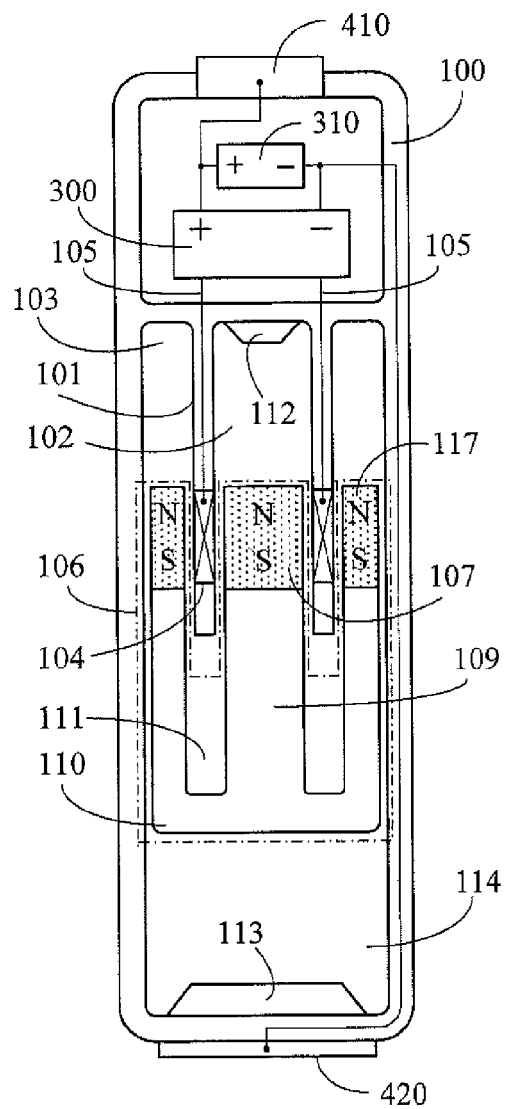
FIG. 4 is a schematic structural view showing an annular power generation coil set having an interior adjacent to and magnetically coupling with a columnar magnet, and an exterior adjacent to and magnetically coupling with an outer magnet having a same polarity as the columnar magnet, according to a third embodiment of the present invention.

The magnetic pole surfaces of the columnar magnet (107) and the columnar magnet (207) may have the same polarity relative to the annular power generation coil set (104) as shown in FIG. 3 or, as shown in FIG. 4, different polarities.

Except for the relative same polarities of the columnar magnet (107) and outer magnet (117), the structure shown in FIG. 4 is otherwise the same as that shown in FIG. 3, with the interior of the annular power generation coil set (104) being coupled with the columnar magnet (107), and the exterior thereof being coupled with the outer magnet (117) relatively installed to have the same polarity as the columnar magnet (107), according to a third embodiment of the present invention. The cross-sectional view of the embodiment of FIG. 4 is the same as that shown in FIG. 2.

Figure 5:
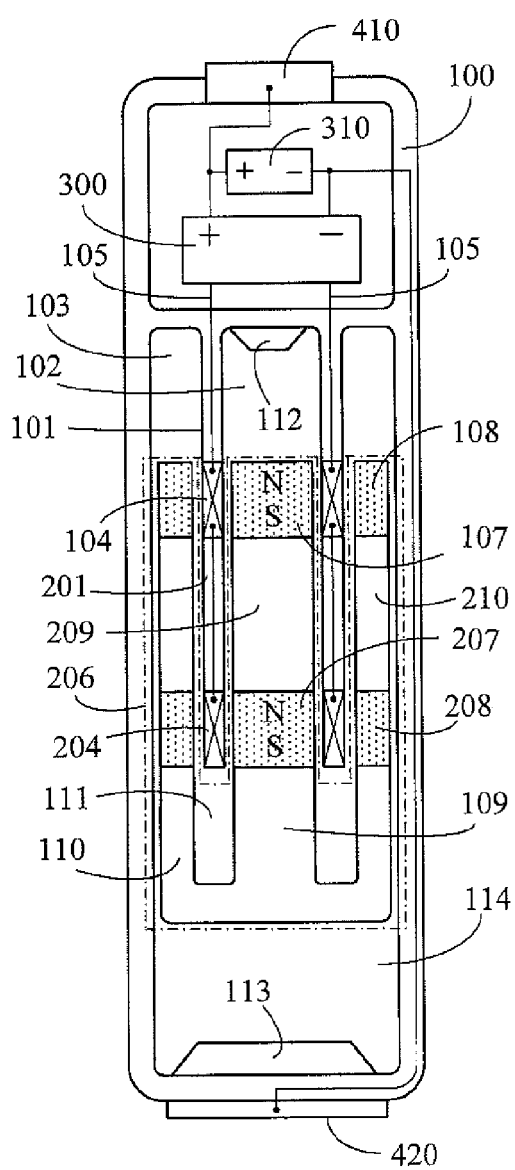
FIG. 5 is a schematic structural view showing annular power generation coil sets arranged in a multiple segment format, the interiors of the annular power generation coil sets being coupled with columnar magnets and the exteriors being coupled with outer magnetic conductive members according to a fourth embodiment of the present invention.

FIG. 5 is a schematic structural view showing annular power generation coil sets (104), (204) arranged in a multiple segment format, the interiors of the annular power generation coil sets (104), (204) being coupled with the columnar magnets (107), (207), and the exteriors thereof being coupled with the outer magnetic conductive members (108), (208), according to a fourth embodiment of the present invention. The cross-sectional view of FIG. 5 is again the same as that shown in FIG. 2.

The embodiment of FIG. 5 has the following features:

A housing (100) is constituted by a material having poor magnetic conduction and poor electric conduction, and is formed in a hollow cylindrical shape having one inner end from which a tubular annular coil set seat (101) inwardly extends with its distal end being combined with an annular power generation coil set (104), with a tubular annular coil set partition seat (201), and extendedly with an annular power generation coil set (204). An annular space (103) is formed between the tubular annular coil set seat (101) and an inner hole of the housing (100), and a center of the tubular annular coil set seat (101) is formed with a round space (102). The annular power generation coil sets (104), (204) are normal-polarity connected in parallel or in series to allow a voltage to accumulate during power generation, and are installed with an output wire (105) for outputting the electric power generated by the annular power generation coil sets (104), (204) to a rectifying and charging circuit (300), the rectified electric power then being output to the anode terminal of a power storage device (310) from the output end of the rectifying and charging circuit (300), and to an anode output/input terminal (410) and a cathode output/input terminal (420) installed in the housing (100) from the anode terminal of the power storage device (310).

A motion block assembly (206) is constituted by a material having poor magnetic conduction and poor electric conduction, and is provided with a cup-shaped structure that forms a motion block (110) for combining with an outer magnetic conductive member (108), and that is further combined with a partition ring (210) of the cup-shaped structure of motion block (110) and extendedly combined with an outer magnetic conductive member (208). The center of the cup-shaped structure of motion block (110) is provided with a center column (109) for combining with a columnar magnet (107), and is further combined with another center column (209) of the motion block (110) and extendedly combined with another columnar magnet (207). The periphery of the central column (109) and the cup-shaped structure of motion block (110) form an inner annular space of a motion block (111) for receiving the annular power generation coil sets (104), (204), the tubular annular coil set partition seat (201), and the tubular annular coil set seat (101) to allow relative axial displacement. The tubular annular coil set seat (101) and the round space (102) of the tubular annular coil set partition seat (201) are arranged to receive the columnar magnets (107), (207) and the center column of motion block (109), (209) to also allow relative axial displacement.

A first buffer member (112) is installed between the round space (102) of the tubular annular coil set seat (101) and the inner wall of the housing (100) for serving as a buffer while the center columns (109), (209) and the columnar magnets (107), (207) of the motion block and the outer magnetic conductive members (108), (208) perform axial displacement.

The interval between the columnar magnet (107) and the columnar magnet (207), which are separated by the center column of motion block (209), and the interval between the annular power generation coil set (104) and the annular power generation coil set (204), which are separated by the tubular annular coil set partition seat (201), enable the annular power generation coil set (104) and the annular power generation coil set (204) to generate a voltage having the same phase when the columnar magnet (107) and the columnar magnet (207), and the outer magnetic conductive member (108) and the outer magnetic conductive member (208), perform the axial reciprocal movement in response to vibrations that cause them to pass the annular power generation coil set (104) and the annular power generation coil set (204).

Rectifying and charging circuit (300) is constituted by electromechanical and solid electronic components and rectifying devices, and provided for rectifying the electric power generated by the annular power generation coil set (104) and inputting the electric power to the power storage device (310).

Power storage device (310) is constituted by a rechargeable secondary battery, ultra capacitor, or capacitor, and provided for storing the electric power from the rectifying and charging circuit (300) or the electric power input from the anode output/input terminal (410) and the cathode output/input terminal (420), Anode output/input terminal (410) is constituted by an electrically conductive terminal head, terminal, plug, or socket structure, and installed in the housing (100) and connected to the anode terminal of the rectifying and charging circuit (300) for outputting or inputting electric energy to the exterior.

Cathode output/input terminal (420) is constituted by electrically conductive terminal head, terminal, plug, or socket structure, and installed in the housing (100) and connected to the cathode terminal of the rectifying and charging circuit (300) for outputting or inputting electric energy to the exterior.

A cylindrical space (114) inside the housing (100) receives the outer periphery of the motion block assembly (106) to allow relative axial displacement of the motion block assembly (106), and a second buffer member (113) is installed between the motion block assembly (106) and the cylindrical space (114) inside the housing (100) for serving as a buffer when the motion block assembly (106) performs the axial displacement.

Figure 6:
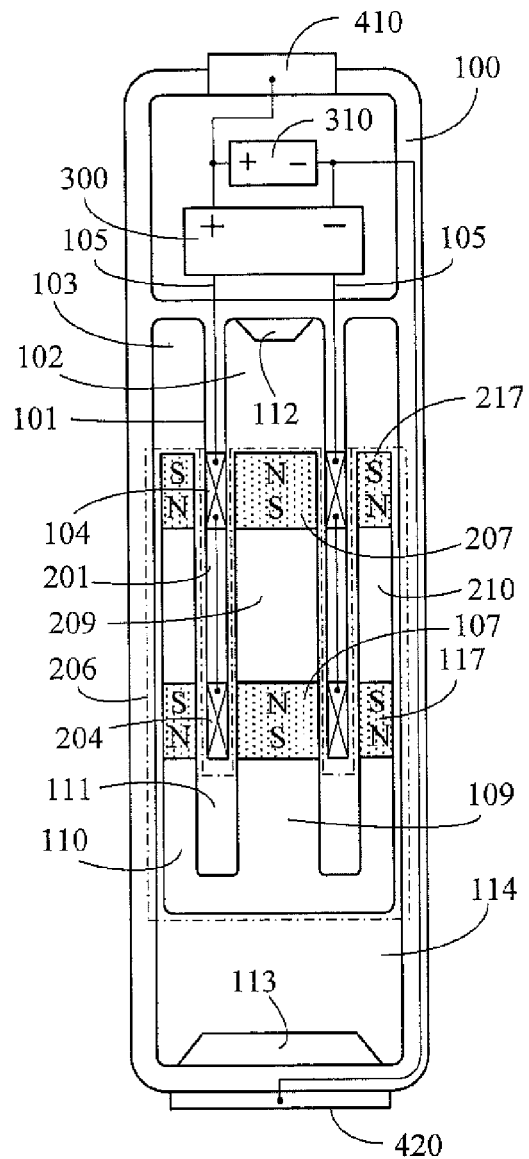
FIG. 6 is a schematic structural view showing annular power generation coil sets arranged in a multiple segment format, the interiors of the annular power generation coil sets being coupled with columnar magnets and the exteriors being coupled with outer magnets arranged in a multiple segment format and having a polarity that is opposite to that of the columnar magnets, according to a fifth embodiment of the present invention.

FIG. 6 is a schematic structural view showing annular power generation coil sets (104), (204) arranged in a multiple segment format, the interior of the annular power generation coil sets (104), (204) being coupled with the columnar magnets (107), (207), and the exterior thereof being coupled with the outer magnets (117), (217) arranged in a multiple segment format and relatively installed to have the same polarity as the columnar magnet (107), according to a fifth embodiment of the present invention. The cross-sectional view of the embodiment of FIG. 6 is the same as that shown in FIG. 2.

The embodiment of FIG. 6 includes the following features:

A housing (100) is constituted by a material having poor magnetic conduction and poor electric conduction, and formed in a hollow cylindrical shape having one inner end from which a tubular annular coil set seat (101) extends inwardly with its distal end being combined with an annular power generation coil set (104), and then combined with a tubular annular coil set partition seat (201) and extendedly combined with an annular power generation coil set (204). An annular space (103) is formed between the tubular annular coil set seat (101) and an inner hole of the housing (100), and a center of the tubular annular coil set seat (101) is formed with a round space (102). The annular power generation coil sets (104), (204) are normal-polarity connected in parallel or in series to enable voltage to accumulate during power generation, and are installed with an output wire (105) for outputting electric power generated by the annular power generation coil sets (104), (204) to a rectifying and charging circuit (300), to the anode terminal of a power storage device (310) from the output end of the rectifying and charging circuit (300), and to an anode output/input terminal (410) and a cathode output/input terminal (420) installed in the housing (100) from the anode terminal of the power storage device (310).

A motion block assembly (206) is constituted by a material having poor magnetic conduction and poor electric conduction, and is provided with a cup-shaped structure that forms a motion block (110) for combining with an outer magnet (117), a partition ring (210) of the cup-shaped structure of motion block (110), and an outer magnet (217) The center of the cup-shaped structure of motion block (110) is provided with a center column (109) for combining with the columnar magnet (107), and a center column (209) for combining with a columnar magnet (207). The periphery of the central column of motion block (109) and the cup-shaped structure of motion block (110) form an inner annular space (111) for receiving the annular power generation coil sets (104), (204), a tubular annular coil set partition seat (201), and a tubular annular coil set seat (101) and allowing relative axial displacement. The tubular annular coil set seat (101) and a round space (102) of the tubular annular coil set partition seat (201) receives the columnar magnets (107), (207) and the center columns (109), (209) of motion block (110) and allows the above-mentioned components to perform relative axial displacement.

A first buffer member (112) is installed between the round space (102) of the tubular annular coil set seat (101) and the inner wall of the housing (100) for serving as a buffer while the center columns (109), (209) and the columnar magnets (107), (207) of the motion block and the outer magnets (117), (217) perform axial displacement.

An interval between the columnar magnet (107) and the columnar magnet (207), and the outer magnet (117) and the outer magnet (217), which are separated by the center column of motion block (209), and an interval between the annular power generation coil set (104) and the annular power generation coil set (204), which are separated by the tubular annular coil set partition seat (201), enable the annular power generation coil set (104) and the annular power generation coil set (204) to generate voltage having the same phase when the columnar magnet (107) and the columnar magnet (207), and the outer magnet (117) and the outer magnet (217), perform axial reciprocal vibration-responsive movement to pass through the annular power generation coil set (104) and the annular power generation coil set (204).

Rectifying and charging circuit (300) is constituted by electromechanical and solid electronic components and rectifying devices, and provided for rectifying the electric power generated by the annular power generation coil set (104) and inputting the electric power to the power storage device (310).

Power storage device (310) is constituted by a rechargeable secondary battery, ultra capacitor, or capacitor, and provided for storing the electric power from the rectifying and charging circuit (300) or the electric power input from the anode output/input terminal (410) and the cathode output/input terminal (420).

Anode output/input terminal (410) is constituted by electrically conductive terminal head, terminal, plug, socket structure, and installed in the housing (100) and connected to the anode terminal of the rectifying and charging circuit (300) for outputting or inputting electric energy to the exterior.

Cathode output/input terminal (420) is constituted by electrically conductive terminal head, terminal, plug, or socket structure, and installed in the housing (100) and connected to the cathode terminal of the rectifying and charging circuit (300) for outputting or inputting electric energy to the exterior.

A cylindrical space (114) inside the housing (100) receives the outer periphery of the motion block assembly (106) to allow the relative axial displacement, and a second buffer member (113) is installed between the motion block assembly (106) and the cylindrical space (114) inside the housing (100) to serve as a buffer when the motion block assembly (106) performs the axial displacement.

As shown in FIG. 6, the magnetic pole surfaces of the columnar magnet (107) and the columnar magnet (207) relative to the annular power generation coil set (104), and the magnetic pole surfaces of the outer magnet (117) and the outer magnet (217) relative to the annular power generation coil set (204), have the same polarity. However, as shown in FIG. 7, the magnetic pole surfaces of the columnar magnet (107) and the columnar magnet (207) relative to the annular power generation coil set (104), and the magnetic pole surfaces of the outer magnet (117) and the outer magnet (217) relative to the annular power generation coil set (204) may also have different polarities.

Figure 7:
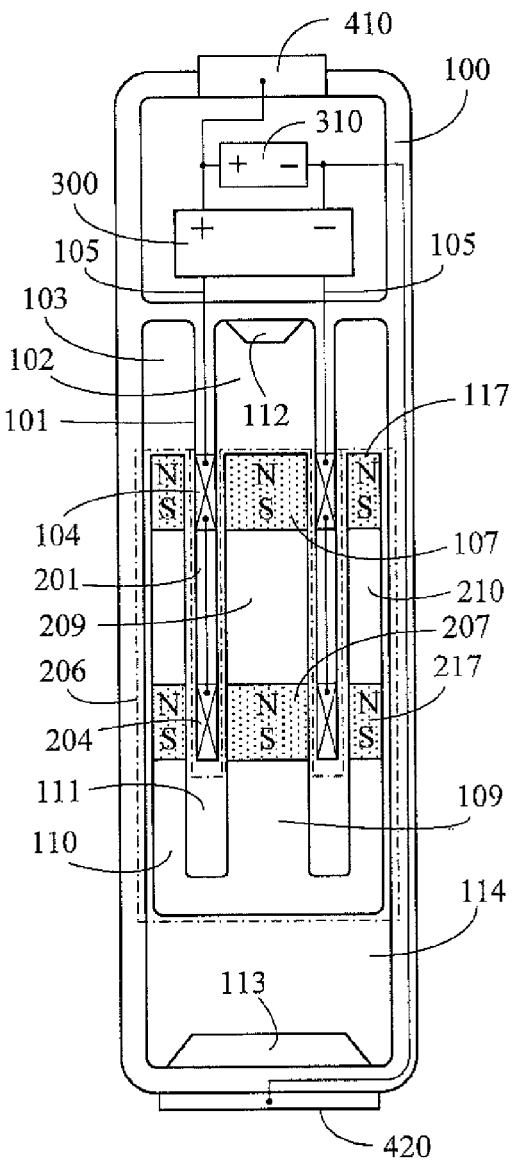
FIG. 7 is a schematic structural view showing annular power generation coil sets arranged in a multiple segment format, the interiors of the annular power generation coil sets being coupled with columnar magnets and the exteriors being coupled with outer magnets arranged in a multiple segment format and having the same relative polarities as the columnar magnets, according to a sixth embodiment of the present invention.
Figures 6, 7:
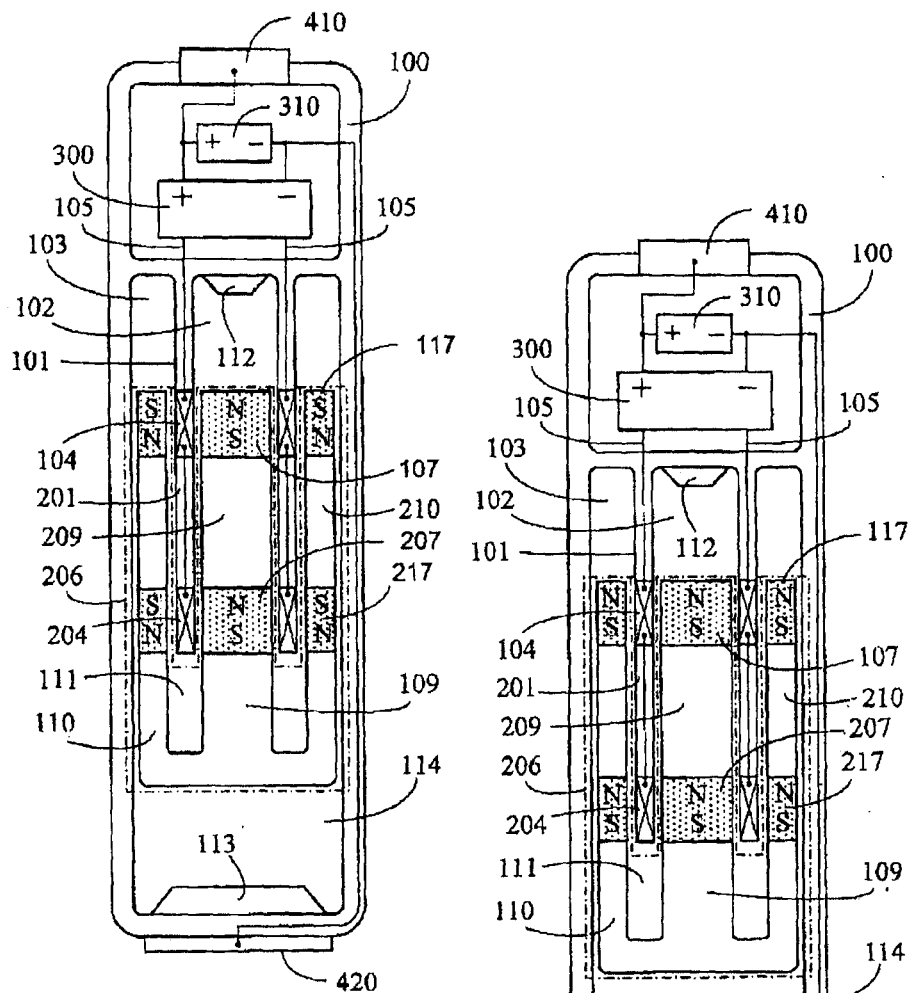

As shown in FIG. 7, annular power generation coil sets (104), (204) is arranged in the same multiple segment format, the interior of the annular power generation coil sets (104), (204) being coupled with the columnar magnets (107), (207), and the exterior thereof being coupled with the outer magnets (117), (217) arranged in the multiple segment format. This structure is the same as shown in FIG. 6, but with relatively different polarities, according to a sixth embodiment of the present invention. Again, the cross-sectional view of the embodiment of FIG. 7 is the same as that shown in FIG. 2.

The embodiments of FIGS. 5-7 may be varied as follows:

The columnar magnet (107), the columnar magnet (207), the annular power generation coil set (104), the annular power generation coil set (204), the outer magnetic conductive member (108) and the outer magnetic conductive member (208) shown in FIG. 5 may all be composed of two units or more than two units.

The columnar magnet (107), the columnar magnet (207), the annular power generation coil set (104), the annular power generation coil set (204), the outer magnet (117) and the outer magnet (217) shown in FIG. 6 and FIG. 7 may all composed of two units or more than two units.

The columnar magnet (107), the columnar magnet (207), the outer magnetic conductive member (108) and the outer magnetic conductive member (208) shown in FIG. 5 may all be composed of two units or more than two units, and the annular power generation coil set (104) composed of one unit.

The columnar magnet (107), the columnar magnet (207), the outer magnet (117) and the outer magnet (217), shown in FIG. 6 and FIG. 7, may all be composed of two units or more than two units, and the annular power generation coil set (104) composed of one unit.

According to the preferred embodiments of the present invention, therefore, a vibration type power generation equipped with an inner columnar and outer annular magnetic motion block further includes a housing (100), an anode output/input terminal (410) and a cathode output/input terminal (420) resulting in a structure having an electrically conductive output interface and shape compatible with those of a conventional battery, but which may be adapted according to actual needs.

The invention claimed is:

1. A reciprocal vibration type power generator, comprising:
a housing (100);
a coil set seat (101);
an annular power generation coil set (104) supported by the coil set seat (101) and including output wires (105) that extend through the coil set seat (101) to a space between the coil set seat and the housing (100);
a motion block (110) including an annular outer magnetic member (108 or 117) and a columnar magnet (107), an inner space (111) being formed between the annular outer magnetic member (108 or 117) and a periphery of the columnar magnet (107), wherein said coil set seat (101) and annular power generation coil set (104) extend into said inner space (111) to enable reciprocal relative axial movement between the motion block (110) and the coil set seat (101) when said generator is vibrated, said relative movement between the motion block (110) and the coil set seat (101) causing said columnar magnet (107) and said annular outer magnetic member (108 or 117) to move reciprocally past the annular power generation coil set (104) and thereby generate electric power;

a rectifying and charging circuit (300) included in said housing (100) and connected to the output wires (105) for rectifying the electric power generated in said annular power generation coil set (104);

an anode input/output terminal (410) installed on the housing (100) and connected to an anode terminal of the rectifying and charging circuit (300);

a cathode input/output terminal (420) installed on the housing (100) and connected to a cathode terminal of the rectifying and charging circuit (300), said anode and cathode input/output terminals (410,420) being for inputting electric power from an external source and for outputting electric power from the rectifying and charging circuit (300) to outside the housing (100);

a power storage device (310) included in said housing (100) for storing rectified electric power received from the rectifying and charging circuit (300) and to output the electric power from the rectifying and charging circuit (300) or input the electric power from the external source through the anode and cathode input/output terminals (410,420) installed on the housing (100).

2. A reciprocal vibration type power generator as claimed in claim 1, further comprising:

a first buffer member (112), installed in a cylindrical space (102) of the coil set seat (101), for serving as a buffer when the columnar magnet (107) and the annular outer magnetic member (108 or 117) move axially past the power coil set (104) towards one end of the housing (100); and a second buffer member (113) installed in a cylindrical space (114) at an opposite end of the housing (100) from said one end of the housing for serving as a buffer when the columnar magnet (107) and the annular outer magnetic member (108 or 117) move axially past the power coil set (104) towards said opposite end of the housing (100).

3. A reciprocal vibration type power generator as claimed in claim 1, wherein said annular outer magnetic member is a magnetically conductive member (108).

4. A reciprocal vibration type power generator as claimed in claim 1, wherein said annular outer magnetic member is a magnet (117) having a different polarity than said columnar magnet (107).

5. A reciprocal vibration type power generator as claimed in claim 1, wherein said annular outer magnetic member is a magnet (117) having a same polarity as said columnar magnet (107).

6. A reciprocal vibration type power generator as claimed in claim 1, further comprising a second annular power generation coil set (204) supported by the coil set seat (101) and electrically connected to the first annular power generation coil set (104); and a second annular outer magnetic member (208 or 217) and a second columnar magnet (207), said second annular outer magnetic member (208, 217) and second columnar magnet (207) being coaxially separated from said first annular outer magnetic member (108, 117) and said first columnar magnet (107) by a partition ring (210) and a center column (209), respectively.

7. A reciprocal vibration type power generator as claimed in claim 6, further comprising:

a first buffer member (112) installed in a cylindrical space (102) of the coil set seat (101) for serving as a buffer when the respective first (108, 117) and second (208, 217) annular outer magnetic members and the respective first and second columnar magnets (107, 207) move axially past the first and second annular power generation coil sets (104, 204) towards one end of the housing (100); and a second buffer member (113) installed in a cylindrical space (114) at an opposite end of the housing (100) from said one end of the housing for serving as a buffer when the respective first (108, 117) and second (208, 217) annular outer magnetic members and the respective first and second columnar magnets (107, 207) move axially past the first and second power coil sets (104, 204) towards said opposite end of the housing (100).

8. A reciprocal vibration type power generator as claimed in claim 6, wherein said first annular outer magnetic member is a magnetically conductive member (108) and said second annular outer magnetic member is also a magnetically conductive member (208).

9. A reciprocal vibration type power generator as claimed in claim 8, wherein said first annular power generation coil set (104) is separated from said second annular power generation coil set (204) by a partition seat (201), and wherein a length of said partition seat (201) and a length of said center column (209) enables said first and second annular power generation coil sets (104, 204) to generate voltages having a same phase.

10. A reciprocal vibration type power generator as claimed in claim 6, wherein said first annular outer magnetic member is an outer magnet (117) having a different polarity than said first columnar magnet (107), and said second annular outer magnetic member is an outer magnet (217) having a different polarity than said second columnar magnet (207).

11. A reciprocal vibration type power generator as claimed in claim 10, wherein said first annular power generation coil set (104) is separated from said second annular power generation coil set (204) by a partition seat (201), and wherein a length of said partition seat (201) and a length of said center column (209) enables said first and second annular power generation coil sets (104, 204) to generate voltages having a same phase.

12. A reciprocal vibration type power generator as claimed in claim 6, wherein said first annular outer magnetic member is a magnet (117) having a same polarity as said first columnar magnet (107), and said second annular outer magnetic member is a magnet (217) having a same polarity as said second columnar magnet (207).

13. A reciprocal vibration type power generator as claimed in claim 12, wherein said first annular power generation coil set (104) is separated from said second annular power generation coil set (204) by a partition seat (201), and wherein a length of said partition seat (201) and a length of said center column (209) enables said first and second annular power generation coil sets (104, 204) to generate voltages having a same phase.

14. A reciprocal vibration type power generator as claimed in claim 6, wherein said first and second columnar magnets (107, 207) and said first (108, 117) and second (208, 217) annular outer magnetic members are each composed of two or more magnetic units.

15. A reciprocal vibration type power generator as claimed in claim 14, wherein the first and second annular power generation coil sets (104, 204) are each composed of two or more coil units.

16. A reciprocal vibration type power generator as claimed in claim 14, wherein the first and second annular power generation coil sets (104, 204) are each composed of a single coil unit.

17. A reciprocal vibration type power generator as claimed in claim 1, wherein said columnar magnet (107) and said annular outer magnetic member (108 or 117) are each composed of two or more magnetic units.

18. A reciprocal vibration type power generator as claimed in claim 17, wherein the annular power generation coil set (104) is composed of two or more coil units.

19. A reciprocal vibration type power generator as claimed in claim 17, wherein the annular power generation coil set (104) is composed of a single coil unit.

* * * * *

UNITED STATES PATENT AND TRADEMARK OFFICE
CERTIFICATE OF CORRECTION

PATENT NO.        : 8,736,086 B2
APPLICATION NO.   : 13/071627
DATED             : May 27, 2014
INVENTOR(S)       : Tai-Her Yang Page 1 of 2

It is certified that error appears in the above-identified patent and that said Letters Patent is hereby corrected as shown below:

In the Drawings:

In Fig. 6, reference number "217" is changed to --117--; reference number "207" is changed to --107--; reference number "107" is changed to --207--; and reference number "117" is changed to --217--. (See attached page)

Signed and Sealed this
Twelfth Day of August, 2014

Michelle K. Lee
*Deputy Director of the United States Patent and Trademark Office*